Nov. 23, 1965 C. C. P. LESAGE 3,220,000

MANUALLY CONTROLLED CODING DEVICE

Filed Feb. 15, 1963 3 Sheets-Sheet 1

INVENTOR

CHRISTIAN CHARLES PAUL LESAGE

INVENTOR
CHRISTIAN CHARLES PAUL LESAGE

Nov. 23, 1965 C. C. P. LESAGE 3,220,000

MANUALLY CONTROLLED CODING DEVICE

Filed Feb. 15, 1963

3 Sheets-Sheet 3

INVENTOR

CHRISTIAN CHARLES PAUL LESAGE

United States Patent Office 3,220,000

Patented Nov. 23, 1965

3,220,000

MANUALLY CONTROLLED CODING DEVICE

Christian Charles Paul Lesage, La Courneuve, France, assignor to Compagnie des Machines Bull (Societe Anonyme), Paris, France Filed Feb. 15, 1963, Ser. No. 258,841
Claims priority, application France, Feb. 19, 1962, 888,465
3 Claims. (Cl. 340—347)

This invention relates to coding devices and is concerned with a manually controlled device for determining a combination corresponding to a character, such as a letter, a decimal digit or various signs, the said device having an indicator panel on which characters capable of being coded are recorded so as to be directly legible to the human eye.

The manual introduction of the characters into "data-processing" machines gives rise to the problem of coding. Such machines are not capable of directly translating ordinary characters in human writing, owing to the complex forms of the latter. It is therefore necessary for each character to be so transposed that it can be represented by a set of symbols, for example a set composed of 1 and 0. In a binary code, the symbols employed, which are called more particularly binary digits, are 1 and 0. In such a code, a character may be represented by a combination comprising a particular number of binary digits. For example, the letter T may be represented by 010100 if six binary digits are employed. The advantage of binary coding resides in the fact that it is relatively easy to represent the binary digits 0 and 1 in a data-processing machine. Thus, for example, it may be arranged that the presence of a current in a conductor represents 1, while the absence of current in the same conductor represents 0, or that the presence of a perforation in a punched card or tape represents 1, while its absence represents 0. In order to differentiate each character transposed in accordance with a binary code, it is necessary for the combination representing one character to differ from that representing a different character. Each combination may be regarded as an association of 1 and 0. By forming all the possible combinations with four binary digits, it is possible to form only 16 different combinations. Only 16 characters can then be coded. By operating with a larger number of binary digits, the number of combinations is increased and it is then possible to code a larger number of characters. Thus, by using 6 binary digits, it is possible to code $2^6=64$ characters, and by using 8 binary digits, $2^8=256$ characters can be coded.

Manually controlled devices are known, which may or may not form part of the machine, and which perform the coding of the characters in accordance with a particular binary code. These devices may be controlled, for example, by a keyboard comprising a predetermined number of keys, each of which is allocated to one character. In some cases, the coding device is even controlled by the keyboard of a typewriter, for example of the type known as a "Flexowriter." Depression of a key corresponding to a particular character effects the binary coding of this character.

Such devices require operators who are sufficiently skilled to be able to introduce coded characters rapidly into a machine. An untrained person loses valuable time seeking the characters on the keyboard. On the other hand, keyboard devices are relatively complex and costly elements. Finally, all these devices, even when used by skilled personnel, are still subject to manual errors, such as an unintentional depression of a key.

One of the objects of the present invention is to overcome the deficiencies of the prior art while employing simple, robust and inexpensive equipment which operates reliably and which does not require to be operated by specialised personnel.

In accordance with the invention there is provided a coding and indicating device adapted to be manually operated to determine a binary coded combination in dependence upon the appearance presented by an indicator, comprising an indicator for producing a visual indication of a character, and two groups of manual commutators adapted to be brought into predetermined positions on the one hand for effecting, in dependence upon the positioning of a control shaft, the application of voltage to conductors preparing for the use of a certain combination of binary components corresponding to the coding of a character, and on the other hand, and simultaneously, for selecting members to cause the image of the said characters to appear on the indicator, whereby the coded combination corresponds to the visually indicated character.

For a better understanding of the invention and to show how it may be carried into effect, the same will now be described, by way of example, with reference to the accompanying drawings, in which.

Figure 1:
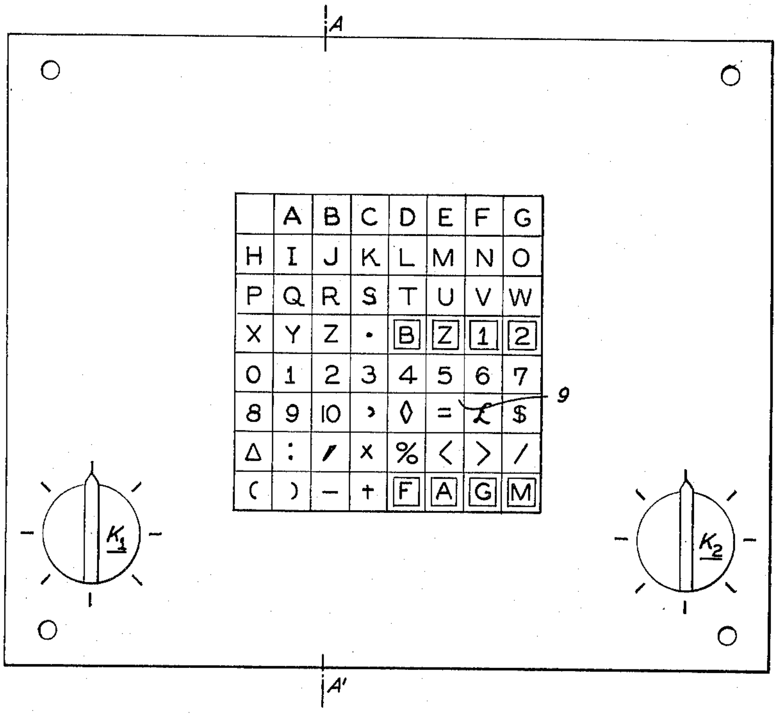
FIGURE 1 illustrates diagrammatically a front view of a coding device constructed in accordance with an embodiment of the invention.

In the device of FIGURE 1, by means of which 64 characters can be coded, the characters are arranged in an indicator panel 9 in rows and in columns and in an order which has been designed to provide an unskilled user with a means of rapidly locating the characters. In a preferred embodiment of the invention, the characters are distributed in 8 rows and 8 columns. Two manually controlled buttons K1 and K2 serve on the one hand to control the visualising action of the indicator panel and on the other hand to effect the binary coding corresponding to the character to be coded.

Figure 2:
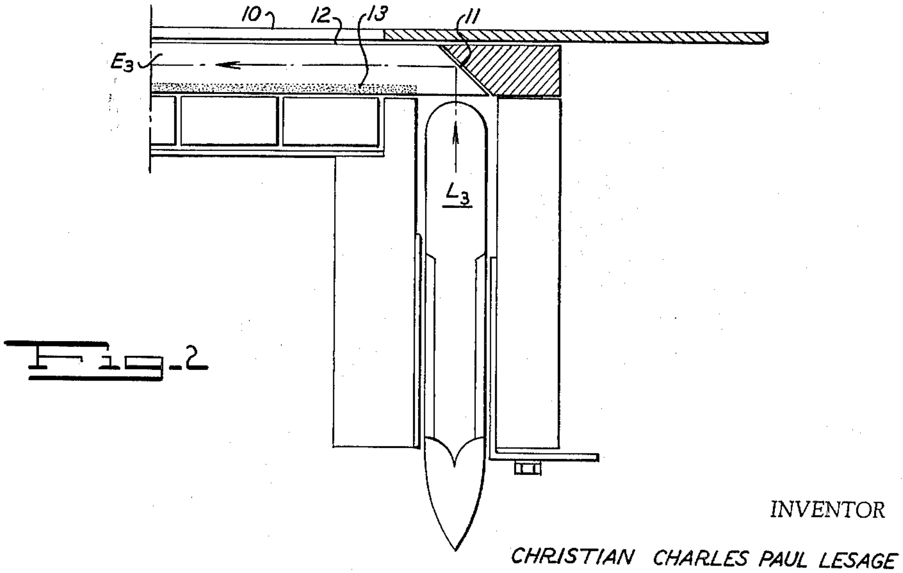
FIGURE 2 is a fragmentary sectional view along the line A–A' of FIGURE 1, which is intended to show the path of the light rays within the optical parts of the device.
Figure 3:
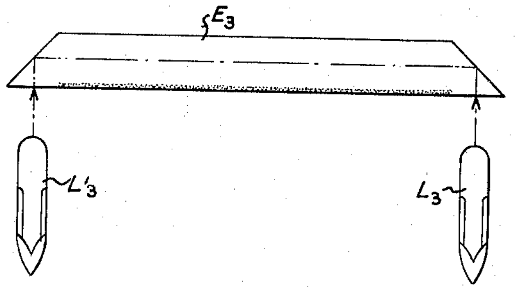
FIGURE 3 is a diagrammatic illustration of a variant of the invention.

The drawing of FIGURE 2 illustrates an arrangement for illuminating the indicator panel. The indicator panel consists of a character plate 10, on which the characters are inscribed and which may be locally illuminated by transparency by means of a bar $E_3$ consisting of transparent material illuminated by a lamp $L_3$. Only the characters constitute the transparent portions of the character plate, which has been rendered opaque in its other parts. Thus, the said plate can be illuminated by means of bars such as the bar $E_3$ only in accordance with the outline of the said characters. The bar $E_3$ consists of a strip having parallel faces, of which one end face 11 is inclined at 45° in relation to its two parallel faces 12 and 13. In order that the bar $E_3$ may appear luminous, a portion of the face 13 (represented by a thickened line in FIGURE 2) has been frosted so as to diffuse the light within the bar. The light rays emanating from the lamp $L_3$ impinge upon the face 11, are reflected therefrom and are thereafter retransmitted in a direction parallel to the faces 12 and 13, the effect of which is to illuminate the entire bar $E_3$. In a variant, the intensity of the reflected rays may be increased by means such as a metallic deposit on the face 11. In another variant, a second lamp $L'_3$ disposed at that end of the bar which is further from the lamp $L_3$ intensifies the luminous effect produced by the lamp $L_3$, as shown in FIGURE 3.

Figure 4:
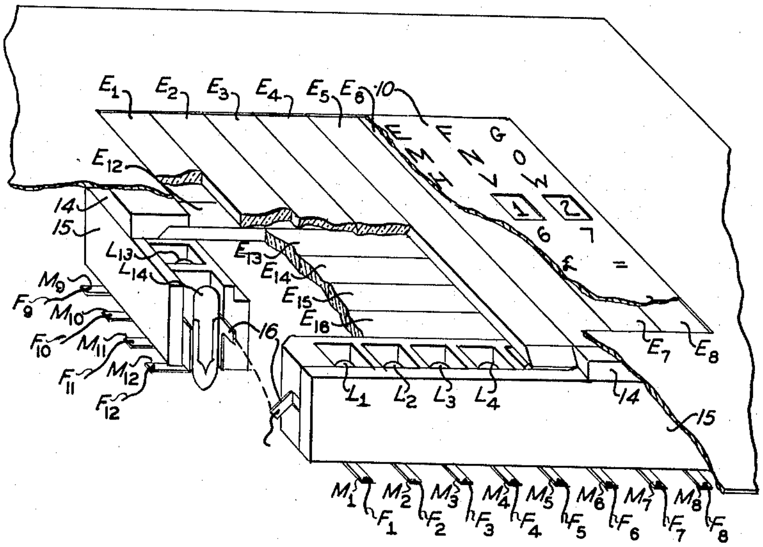
FIGURE 4 is a diagrammatic view in perspective of a portion of the device of FIGURE 1, with parts broken away to illustrate the description and more especially to show the assembly of the various component parts of the said device.

FIGURE 4 shows the assembly of the various parts of the indicator panel. As will be seen on referring to FIGURE 4, the 8 columns of the indicator panel are formed of a series of 8 bars $E_1$ to $E_8$ similar to the bar $E_3$ and disposed parallel to one another, so as to form a flat layer on which the character plate 10 is mounted. Disposed below the said layer is a second layer formed of 8 bars $E_9$ to $E_{16}$ identical to the preceding bars, but disposed transversely in relation to the bars $E_1$ to $E_8$. The 8 bars $E_9$ to $E_{16}$ thus form the 8 rows of the indicator panel. The 16 bars $E_1$ to $E_{16}$ are maintained in position by cross-members 14. Associated with each of the bars $E_1$ to $E_{16}$ is a lamp $L_1$ to $L_{16}$, by means of which the corresponding bar can be illuminated. The lamps are enclosed in lamp holders 15 of insulating material, each of which contain 8 lamps. Each of the lamps $L_1$ to $L_{16}$ is held fast by means of contacts consisting, on the one hand, of a conductive strip 16 common to a group of 8 lamps, such as the group of lamps $L_1$ to $L_8$, or the group of lamps $L_9$ to $L_{16}$, and on the other hand of one of conductive lugs $M_1$ to $M_{16}$. An electric circuit can thus be established by means of conductor wires $F_1$ to $F_{16}$ connected to the lugs $M_1$ to $M_{16}$ respectively, and by means of a conductor wire 17 connected to the strips 16. On application of an appropriate voltage between the strips 16 and one of the conductive lugs, the lamp in contact with the said lug is lit, whereby the bar associated with the said lamp is illuminated.

Figure 5:
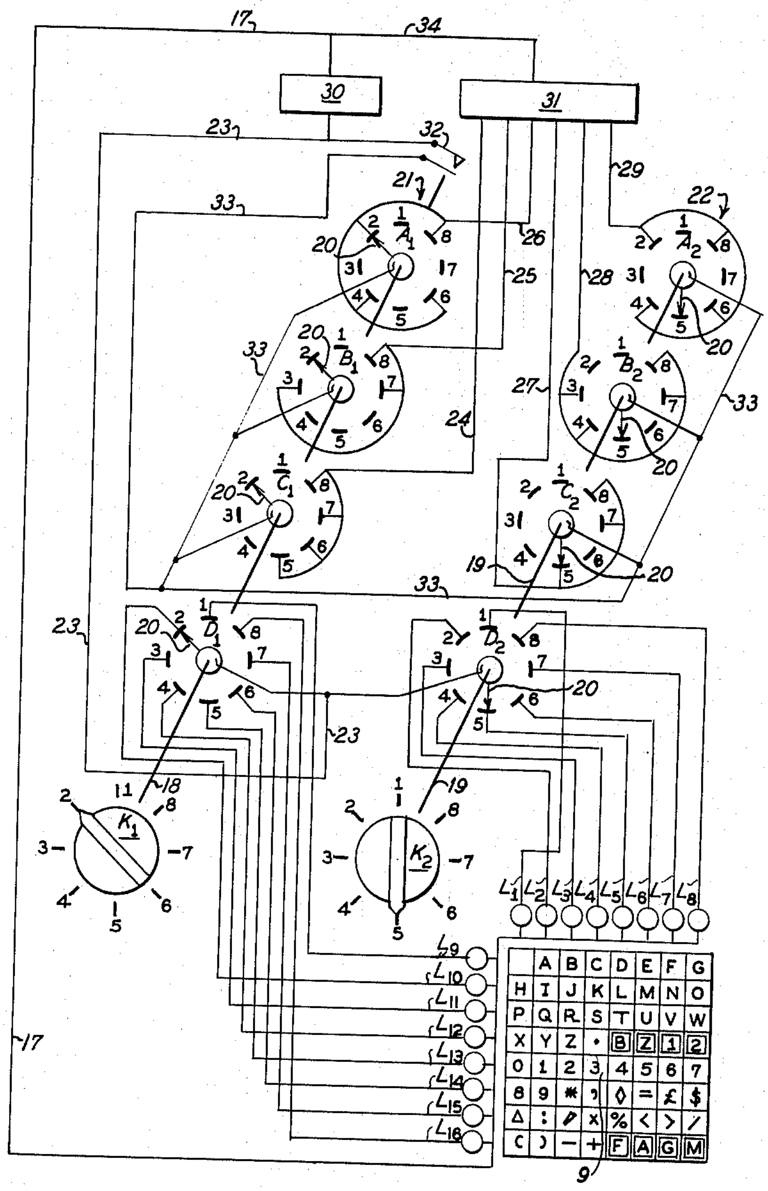
FIGURE 5 illustrates a circuit diagram of the invention.

FIGURE 5 is a general circuit diagram of a 64-character coding device. There are shown in this figure two groups of commutators 21 and 22. The group of commutators 21 comprises 4 commutators $A_1$, $B_1$, $C_1$, $D_1$ fixedly mounted on a shaft 18, on the end of which there is mounted a control button $K_1$ having 8 positions. The group of commutators 22 comprises four commutators $A_2$, $B_2$, $C_2$, $D_2$ fixedly mounted on a shaft 19, on the end of which is mounted a control button $K_2$ having 8 positions. Each of the commutators comprises 8 contact studs numbered from 1 to 8, which correspond respectively to the 8 positions of the control buttons and over which there moves a small slider 20. The group of commutators 21 is so designed that on rotation of the button $K_1$ the sliders of $A_1$, $B_1$, $C_1$, $D_1$ are moved and brought on to contact studs corresponding to the position of the button $K_1$. For example, when the button $K_1$ is brought to the position 2, all the sliders of $A_1$, $B_1$, $C_1$, $D_1$ are brought on to the studs 2. Likewise, the group of commutators 22 is so designed that when the button $K_2$ is rotated the sliders of $A_2$, $B_2$, $C_2$, $D_2$ are moved and brought on to the contact studs corresponding to the position of the button $K_2$. The commutators $D_1$ and $D_2$ serve to control the visualising action of a 64-character indicator panel 9 in which the characters are distributed in 8 rows and 8 columns. Associated with one row is a lamp $L_9$ to $L_1$. Likewise, there is associated with a column a lamp $L_1$ to $L_8$. Each lamp $L_1$ to $L_8$ is connected on the one hand to a common conductor 17 and on the other hand to one of the 8 studs of $D_2$, respectively. Each lamp $L_9$ to $L_{16}$ is likewise connected on the one hand to the conductor 17, and on the other hand to one of the 8 studs of $D_1$, respectively. The sliders of $D_1$ and $D_2$ are connected through a conductor 23 to one of the poles of a current source 30, and the sliders of $A_1$, $B_1$, $C_1$, $A_2$, $B_2$, $C_2$ are connected to the same pole by means of a conductor 33. Connected to the other pole of the current source 30 are the conductor 17 and another conductor 34 extending from a utilizing member 31. The structure of this utilizing member is of any conventional construction and may be constituted, for example, by solenoids associated with the punch mechanism of a tape perforator. The member 31 is connected to the commutators $C_1$, $B_1$, $A_1$, $C_2$, $B_2$, $A_2$, respectively, by means of 6 conductors 24, 25, 26, 27, 28, 29. A validation switch 32, such as a push button for example is disposed on the conductor 33. In order to effect the binary combination corresponding to a particular character, some of the contact studs belonging to a common commutator are connected together and the connection thus made at a common commutator will hereinafter be called inter-stud connections. If it is arranged that the passage of a current through a conductor can represent the binary digit 1, while non-passage thereof can represent the binary digit 0, each of the 6 conductors 24, 25, 26, 27, 28, 29 may then represent a binary digit which is either 1 or 0, depending upon whether or not a current flows through the said conductor. These 6 conductors can thus serve as a whole to represent the binary combination of a particular character. This combination will be obtained by considering successively the state of each conductor 24, 25, 26, 27, 28, 29 and writing one after the other the binary digits represented by the state of these 6 conductors respectively. For example, if the current flows only through the conductors 25, 26, 28, the combination represented will be 011010. For a given position of the sliders of the commutators belonging to one and the same group of commutators, the passage of the current through the conductors connecting these commutators to the utilizing member 31 will depend upon the manner in which the inter-stud connections are made. Thus, referring to the diagram of FIGURE 5, a circuit can be established from the source 30, after validation by the switch 32, through the conductor 33, the commutators $A_1$, $B_1$, $C_1$, $A_2$, $B_2$, $C_2$, the 6 condutcors 24, 25, 26, 27, 28, 29, the member 31 and the conductor 34. Considering the inter-stud connections of the commutators $A_1$, $B_1$, $C_1$, $A_2$, $B_2$, $C_2$ in FIGURE 5, it will then be possible, by positioning the group of commutators 21 successively on each of its 8 positions, to form the following combinations by means of the conductors 24, 25, 26:

For the position:

| | |
|---|---|
| 1 | 000 |
| 2 | 001 |
| 3 | 010 |
| 4 | 011 |
| 5 | 100 |
| 6 | 101 |
| 7 | 110 |
| 8 | 111 |

Simultaneously, a circuit is established, for each of these 8 positions, from the source 30 through the conductor 23, the slider of $D_1$, one of the wires leading to one of the lamps $L_9$ to $L_{16}$, and the conductor 17 connected to the source 30. One line, and one only, of the indicator panel will then be illuminated for a given position of the group of commutators 21, which can produce at the conductors 24, 25, 26 one of the 8 combinations of 3 binary digits which it can form. The operation of the group of commutators 22 is identical to that of the group of commutators 21, so that one column, and only one, of the indicator panel is illuminated for a given position of the group of commutators 22, which can produce at the conductors 27, 28, 29 one of the 8 other combinations of 3 binary digits which it can form. By associating these two groups of commutators as illustrated in FIGURE 5, it is possible to illuminate simultaneously a single row and a single column of the indicator panel, while a binary combination of 6 binary digits can be formed by the 6 conductors 24, 25, 26, 27, 28, 29. This binary combination will be the coded representation of the character situated at the intersection of the row and of the column, both illuminated, of the indicator panel.

The invention will be more readily understood with reference to the device illustrated in FIGURE 5 and from a description of an example of a coding operation. For a ready understanding, it will be assumed that it is desired to code the character L with the aid of the said device. An attempt will be made to illuminate the row in which the character L is situated by operating the button $K_1$, and to illuminate the column in which the said character is situated by operating the button $K_2$. These operations can be simply performed by sight, even by an unskilled operator, by observing the indicator panel and turning the buttons $K_1$ and $K_2$ in the appropriate direction. On the other hand, it can be verified from the panel that the character which is visually indicated is in fact that which it is desired to code. On completion of the aforesaid operations, the sliders of the group of commutators 21 are positioned on the studs 2, while the sliders of the group of commutators 22 are positioned on the studs 5. In these positions, the commutators $A_1$, $B_1$, $C_1$ can form the combination 001, while the commutators $A_2$, $B_2$, $C_2$ can form the combination 100. The 6 conductors 24, 25, 26, 27, 28, 29 will then represent the combination 001100.

By depression of the switch 32, this combination corresponding to the coding of the character L will be introduced into the member 31. The switch 32 affords the possibility of effecting this introduction only after the character has been visually displayed on the panel, whereby many errors of introduction can be avoided.

Although the invention has been described in its application to a preferred embodiment, it may be applied in other forms. Thus, the number of commutators in each group may vary as a function of the number of characters to be coded. Thus, it is possible to provide, in addition to the commutators $D_1$ and $D_2$ for the visual indication on the indicator panel, $n$ commutators in the group 21 and $p$ commutators in the group 22, which switches may effect the binary coding of $2^{n+p}$ characters, so that the combination corresponding to the coding of any one of these characters comprises $(n+p)$ binary digits, while effecting the visual indication of these characters disposed in an indicator panel in $2^n$ rows and $2^p$ columns. In this case, the commutators of the group 21 must comprise $2^n$ studs, while those of the group 22 must comprise $2^p$ studs. In addition, the validation switch 32 may be disposed, as desired, either on the conductor 33 or preferably, as indicated in FIGURE 5, on the end of one of the shafts of the group of commutators, for example at the end of the shaft 18. In this case, the validation is effected simply by moving the button $K_1$ in the direction of the shaft 18, so that this movement enables the switch 32 to close the coding circuit. This procedure affords the possibility of rapidly effecting a manual coding without the buttons $K_1$ and $K_2$ having to be released. For the sake of safety, and more particularly in order to reduce the danger of faulty operation, a switch identical to the switch 32 may be disposed, similarly to the switch 32, on the end of the shaft 19 so that these two switches can be connected in series and can validate the coding only if both are closed.

Although the foregoing description and the accompanying drawings relate to one embodiment of the invention, it is obvious that various adaptations, modifications, additions or omissions within the scope of the said invention may be made without the principle of the invention thus being modified.

1. In a character coding and displaying arrangement, a character displaying member consisting of a transparent member and of a mask fitted with $2^n \times 2^p$ character images arranged in a grid array of $2^n$ rows and $2^p$ columns of images to be selectively illuminated, and also of $2^n$ illuminating devices each asociated with a row of images and of $2^p$ illuminating devices each associated with a column of images, each of said illuminating devices being able, when energized, to illuminate a row, or column, of images;

a voltage source;

a first selecting unit comprising a first manually-set commutator consisting of a plurality of commutator sections having each a single wiper arm connected to said voltage source and mounted on a common shaft and $2^n$ contact studs, with a first commutator section whose contact studs are connected to energize one of said $2^n$ row illuminating devices according to the angular position of said wiper arm and with $n$ commutator sections whose contact studs are connected to $n$ code output wires in order to selectively energize a different coded combination of said wires in accordance with said angular position of said wiper arm;

and a second selecting unit comprising a second manually set commutator consisting of a plurality of commutator sections having each a single wiper arm connected to said voltage source and mounted on a common shaft and $2^p$ contact studs, with a first commutator section whose contact studs are connected to energize one of said $2^p$ column illuminating devices according to the angular position of said wiper arm and with $p$ commutator sections whose contact studs are connected to $p$ code output wires in order to selectively energize a different coded combination of said wires in accordance with said angular position of said wiper arm; whereby a unique dual combination of said wires is set under voltage in correspondence with the character image pertaining both to the row of character images illuminated and to the column of character images illuminated.

2. A character coding and displaying arrangement according to claim 1, in which the numbers $n$ and $p$ are each equal to 3, so that 64 different character images can be displayed.

3. A character coding and displaying arrangement according to claim 1, wherein each of said illuminating devices comprises one elongated member made of a light transmitting material and at least one incandescent filament tube located close to an extremity of said member.

References Cited by the Examiner

UNITED STATES PATENTS

| | | | |
|---|---|---|---|
| 2,603,716 | 7/1952 | Low | 315—169 |
| 2,892,968 | 6/1959 | Kallmann et al. | 313—108.1 |
| 2,928,980 | 3/1960 | Williams | 313—108.1 |
| 2,932,770 | 4/1960 | Livingston | 313—108.1 |
| 2,958,859 | 11/1960 | Lentz et al. | 340—347 |
| 3,034,715 | 5/1962 | Wagner | 340—347 |
| 3,066,242 | 11/1962 | Boyd | 313—108.1 |

MALCOLM A. MORRISON, *Primary Examiner.*